US006163298A

United States Patent [19]

Ishihara

[11] Patent Number: 6,163,298

[45] Date of Patent: Dec. 19, 2000

[54] ROUTE GUIDANCE APPARATUS

[75] Inventor: Fuminari Ishihara, Susono, Japan

[73] Assignee: Toyota Jidosha Kabushiki Kaisha, Toyota, Japan

[21] Appl. No.: 09/073,913

[22] Filed: May 7, 1998

[30] Foreign Application Priority Data

May 19, 1997 [JP] Japan .................................... 9-128958

[51] Int. Cl.[7] ........................................................ G01S 3/02

[52] U.S. Cl. ........................... 342/457; 701/208; 701/209

[58] Field of Search ............................. 342/457; 701/209, 701/208

[56] References Cited

U.S. PATENT DOCUMENTS 5,839,086 11/1998 Hirano .................................... 701/201

FOREIGN PATENT DOCUMENTS 19547574 10/1996 Denmark .
0694895 A2 1/1996 European Pat. Off. .
7-234995 9/1995 Japan .
7-234996 9/1995 Japan .

*Primary Examiner*—Theodore M. Blum
*Attorney, Agent, or Firm*—Pillsbury Madison & Sutro LLP

[57] ABSTRACT

A system (UTMS) is disclosed for sending guiding destination data to a control center and calculating a recommended route at the control center while taking traffic conditions into account and presenting the route to a vehicle, in which a route guidance apparatus promptly obtains the recommended route. A controller installed on the vehicle uses data stored in a map data memory to independently search for a route to a destination, and a UTMS link positioned on the obtained route is transmitted to the control center as guiding destination data. Until the search completes, immediately after the destination has been set, a UTMS area to which that destination belongs is transmitted to the control center as temporary guiding destination data. Thereafter, a UTMS link that appears from the search is transmitted as guiding destination data. A recommended route is obtained from the control center even before the search completes, thereby improving the utilization efficiency of the UTMS.

15 Claims, 6 Drawing Sheets

ROUTE GUIDANCE APPARATUS

BACKGROUND OF THE INVENTION

1. Field of the Invention

The present invention relates to a route guidance apparatus, and in particular, to route guidance apparatus employing a Universal Traffic Management System (UTMS), such as via road beacons and car telephones.

2. Description of the Related Art

A UTMS has been developed in which a vehicle's destination data is transmitted, such as from the vehicle to a road beacon, and a control center, such as one connected to the road beacon, a recommended route to the destination taking into account traffic conditions is calculated, and route information to the vehicle via the road beacon is returned. Various types of traffic information (such as traffic congestion information and accident information) are gathered at the control center so that a more suitable route to the destination can be presented to the vehicle compared to what can be obtained by simply considering only map data.

However, the vehicle's destination does not always fall within the service area of the UTMS. A problem in such a case is that, even if destination data is transmitted from the vehicle, the control center cannot present a route to the vehicle using UTMS.

Japanese Laid-Open Publication No. Hei 7-234995, for example, therefore proposes a technique for transmitting to a road beacon coordinates corresponding to the farthest link from the present position on a route calculated at the vehicle and within the area in which routes can be provided by the control center as a temporary destination.

According to this technique, a recommended route can be reliably obtained from the control center. However, since a temporary destination to be transmitted to the control center is not determined until route searching completes at the vehicle, a problem is that the UTMS service cannot be received even though a user may have set the destination and the vehicle passes a road beacon. Of course, with road beacons installed to a certain extent in close proximity to each other, any time loss can be practically eliminated even after a road beacon is passed, provided the route search processing completes before the next road beacon is passed and a temporary destination can be transmitted to that next road beacon. However, since the intervals between road beacons are large, especially outside the major cities, a problem is that a considerable amount of time is required from the setting of the destination until the obtaining of a suitable recommended route from the control center.

SUMMARY OF THE INVENTION

The present invention takes into consideration the problems inherent in the above art and has an object of providing a route guidance apparatus that allows a route which takes traffic conditions into account to be promptly obtained from the control center even though route searching at the vehicle is not completed.

In order to achieve the above-mentioned object, the route guidance apparatus of the present invention comprises destination setting means, memory means for storing map data and UTMS data held by the control center, and transmitting means for transmitting to the control center as temporary guiding destination, when a destination has been set with the destination setting means, UTMS area data to which the destination belongs. This promptly yields a route that reaches the UTMS area in the vicinity of the destination.

The route guidance apparatus of the present invention further comprises route searching means for searching for a shortest route to the destination using map data, where the transmitting means, after transmitting the UTMS area data, when the shortest route is obtained by the route searching means, transmits as a guiding destination a UTMS node or UTMS link in the vicinity of the destination including a part of the shortest route. Transmitting the UTMS area data to which the destination belongs before searching by the route searching means enables a route to the UTMS area to be promptly obtained. Furthermore, transmitting the UTMS link or UTMS node when route searching completes at the route searching means enables an optimum route to the destination to be obtained.

In the route guidance apparatus of the present invention, the transmitting means, after transmitting the UTMS area data, transmits the first UTMS link or UTMS node obtained through route searching by the route searching means from the destination toward the present position as the guiding destination. Transmitting the UTMS area data, then transmitting the first UTMS link or UTMS node obtained during route searching, enables a route to be promptly obtained using the UTMS, even if route searching by the route searching means between the present position and destination is not completely performed.

Furthermore, in another aspect of the route guidance apparatus of the present invention, the transmitting means, after transmitting the UTMS area data, transmits as the guiding destination the first UTMS link or UTMS node obtained through route searching by the route searching means from the destination toward the present position, and when the shortest route is obtained thereafter by the route searching means, transmits as the final guiding destination a UTMS link or UTMS node in the vicinity of the destination including part of the shortest route. Transmitting the UTMS area data, then transmitting the first UTMS link or UTMS node obtained during route searching, and further transmitting the first UTMS link or UTMS node obtained through route searching by the route searching means enable a route to be promptly obtained and finally an optimum route to the destination to be obtained.

Still further, in the route guidance apparatus, the transmitting means, after transmitting the UTMS area data, transmits as the guiding destination a UTMS link or UTMS node satisfying predetermined conditions among a plurality of UTMS links or UTMS nodes obtained by the route searching means during route searching from the destination toward the present position. Transmitting from among the plurality of UTMS links or UTMS nodes obtained during route searching from the destination toward the present position, a UTMS link or UTMS node satisfying predetermined conditions, preferably a link or node existing within a predetermined angle from the destination toward the present position and having no traffic restrictions, enables a more suitable route to be obtained.

Still further, in the route guidance apparatus, the transmitting means, after transmitting the UTMS area data, transmits as the guiding destination a UTMS link or UTMS node satisfying predetermined conditions among a plurality of UTMS links or UTMS nodes obtained by the route searching means during route searching from the destination toward a present position, and, when the shortest route is obtained thereafter by the route searching means, transmits as a final guiding destination a UTMS link or UTMS node in the vicinity of the destination including part of the shortest route. This enables a suitable route to be promptly obtained from the control center even while the route searching means is in the route searching process, and further finally enables an optimum route to be obtained.

Still further, the route guidance apparatus includes means for inhibiting the transmission of the final guiding destination by the transmitting means when the final guiding destination is separated from the destination by at least a predetermined value. In the case where the final guiding destination is separated from the destination by at least a predetermined value, the interval in which the UTMS service can be received is that much shorter. A temporary guiding destination, although not necessarily optimum (a better UTMS link may exist since route searching has not yet completed), is at least near the destination so that inhibiting the transmission of the final guiding destination and transmitting only the temporary guiding destination or the guiding destination enable the interval in which the UTMS can be used to be extended.

It should be noted that "UTMS data" includes various types of data required by the UTMS in receiving the information provided from the control center, such as UTMS area data, UTMS link data, and UTMS node data.

DETAILED DESCRIPTION OF THE PREFERRED EMBODIMENT

A first embodiment of the present invention will be described in the following with reference to the drawings.

Figure 1:
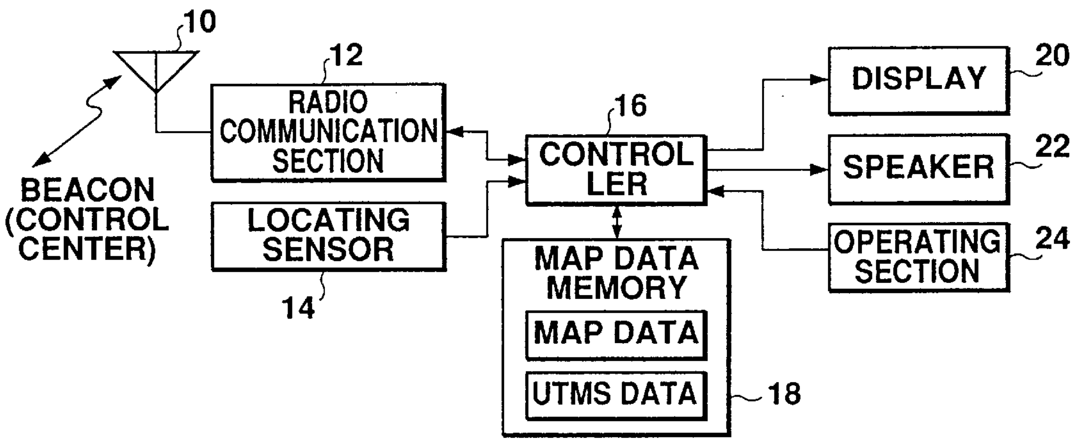
FIG. 1 is a block diagram illustrating a first embodiment of the present invention.

FIG. 1 shows a block diagram of the first embodiment. An antenna 10 and a radio communication section 12 perform bi-directional data communications between a vehicle and beacons. To the radio communication section 12 is connected a controller 16 comprising a microcomputer and memory, which supplies destination data from an operating section 24 and vehicle-related data (such as vehicle speed) to the radio communication section 12 for transmission to a beacon (or a control center), and displays recommended route data received from the beacon onto a display 20 or outputs audio to a speaker 22. The operating section 24 may comprise a touch panel on an LCD screen or the like, and the display 20 and the operating section 24 can also be integrated. A locating sensor 14, which comprises a global positioning system, a wheel speed sensor, or a gyro-sensor, locates the present position of a vehicle, and supplies data thereon to the controller 16. A map data memory 18, which comprises a CD-ROM or the like, is loaded with road map data and other road information (such as a road category and a distance) necessary for route searching. Using these data, the controller 16 can display on the display 20 the map data with the present position overlapping, and can search for a route to a destination independently of the control center. In addition to map data, the map data memory 18 is loaded with UTMS data, or, more specifically, UTMS area data, UTMS link data, and UTMS node data, and also with correspondence relationships between map data links and nodes with UTMS links and UTMS nodes. For instance, map data links and UTMS links are respectively assigned identification numbers, and a map data link and a UTMS link existing at the same position are both set with an overlap flag of "1". An example correspondence table is shown below.

| Searched route link number | Overlap flag | Corresponding UTMS link number |
|---|---|---|
| 123455 | 0 | — |
| 123456 | 1 | 567889 |
| 123457 | 1 | 567890 |
| 123458 | 0 | — |
| . | . | . |
| . | . | . |
| . | . | . |

In order for a UTMS link corresponding to a map data link to exist, the map data link and UTMS link are not necessarily identical, namely, it is not necessary for both of their ends to match. If part of a UTMS link overlaps with a map data link, the overlap flag is set to "1".

With the above structure, a user seeking an optimum route to a destination inputs that destination through the operating section 24. The destination may be specified using any method, such as via the input of its name or positional coordinates. The input destination is sent to the controller 16, which then searches for a route from the present position to the destination using the map data stored in the map data memory 18. A Dijkstra method or the like can be used for the search method to search from the destination toward the present position.

After this search completes in a conventional route guidance apparatus, a UTMS link on the search route is transmitted to a road beacon as guiding destination data. However, since the guiding destination data cannot be transmitted until the search completes as mentioned above, a recommended route cannot be obtained from the control center. In the present embodiment, therefore, the controller 16 transmits temporary guiding destination data before the search completes so that a recommended route is obtained from the control center.

Figure 2:
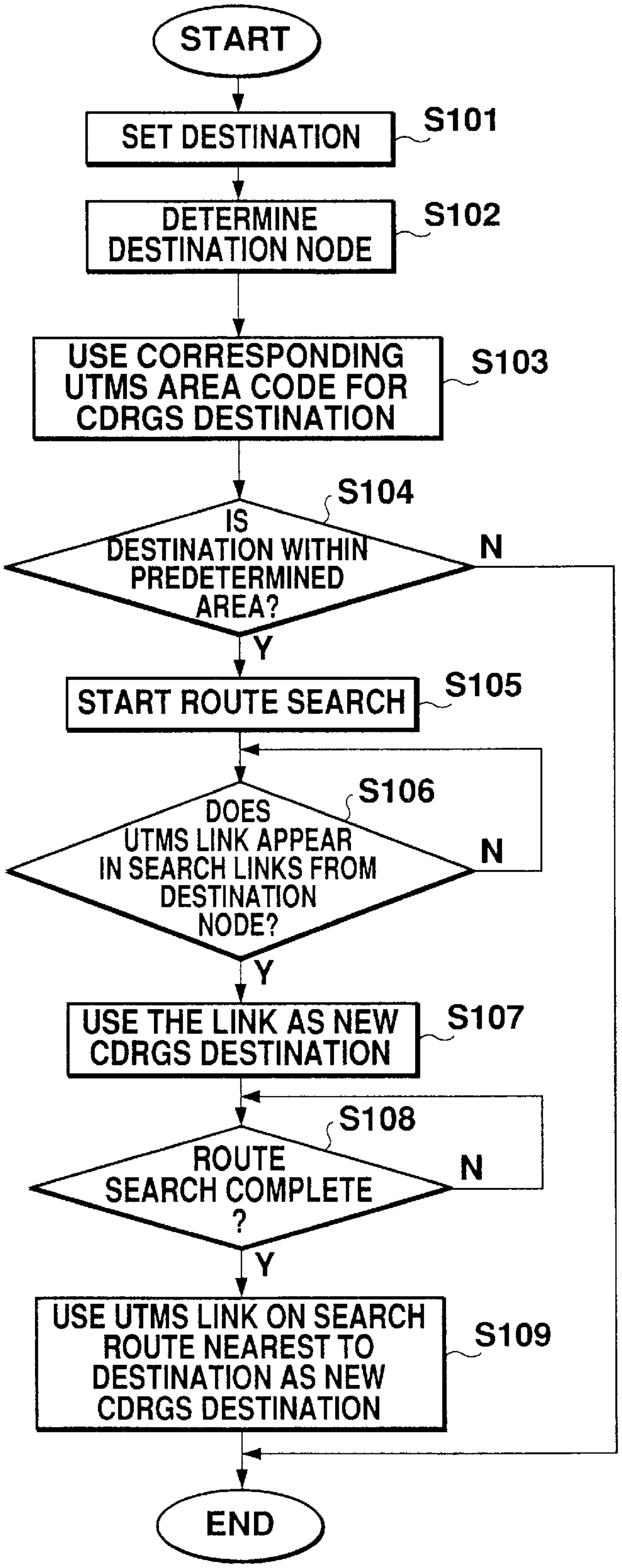
FIG. 2 is a process flowchart for the first embodiment of the present invention.

FIG. 2 shows a process flowchart for the controller 16. First, when a user inputs a destination (S101) using the operating section 24, the controller 16 determines a destination node on the map data corresponding to the input destination (S102). Then, before searching for a route to this destination node, the radio communication section 12 transmits to a road beacon a UTMS area code corresponding to the destination node (S103) as temporary guiding destination data. In the figure, the temporary guiding destination data is called a CDRGS destination because it is a destination of the Centrally Determined Route Guidance System (CDRGS) that determines routes at the control center. The UTMS area code is promptly determined in the manner described below.

Figure 4:
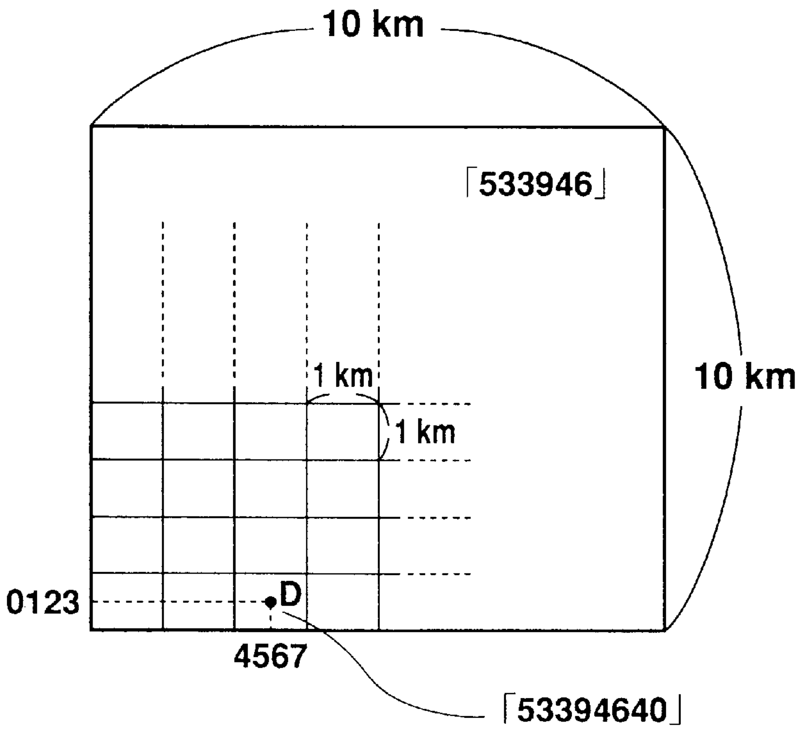
FIG. 4 illustrates the relationship between the destination coordinates and the UTMS area code.

Generally, the UTMS covers the entire country with a hierarchical structure comprising a primary mesh, a secondary mesh, and a tertiary mesh, where each mesh covers the entire country. The primary mesh is a square area having sides of approximately 80 km, the secondary mesh is a square area having sides of approximately 10 km, and the tertiary mesh is a square area having sides of approximately 1 km. For example, as shown in FIG. 4, if the relative coordinates of destination node D within the area of secondary mesh code "533946" are (0123, 4567) within that mesh, the UTMS area code of the tertiary mesh corresponding to these coordinates is "533946" since it is at least included in the area specified by the secondary mesh code "533946". Furthermore, the UTMS area code exists at a position specified from the relative coordinates by the most significant digit of 0 in the X coordinate and the most significant digit of 4 in the Y coordinate so that the UTMS area code to which destination node D belongs is set as "53394640". Thus, if the secondary mesh code and relative coordinates of the destination node are set in this manner, the UTMS area code, which is the tertiary mesh, can be automatically set, thereby allowing the UTMS area code to which the destination belongs to be transmitted immediately after the destination has been set.

Once the UTMS area code is transmitted, the control center considers the traffic condition information (for example, whether there is an accident or a traffic jam, a corresponding transit cost is heavily weighted so that a route having minimal cost is set) and sets a route, which can be returned to the vehicle, from the present position of the vehicle to a representative point of the UTMS area (this representative point being set beforehand at the control center). Therefore, immediately after the destination has been set, the vehicle can obtain from the control center a recommended route to a vicinity of the destination (representative point of the UTMS area to which the destination belongs) so that the user can be guided reliably toward the destination, even immediately after setting that destination.

After the UTMS area code is transmitted in the above-mentioned manner, the controller 16 judges whether the set destination exists within a predetermined area (S104). The predetermined area specifically defines a service area (area in which dynamic route guiding information is provided) for the UTMS. When the destination is located outside the UTMS service area, the control center can only provide a route to a representative point of the UTMS area to which that destination belongs even though a link or node in the vicinity of the destination may have been transmitted from the vehicle. As a result, the route searching process at the vehicle is not performed subsequently, and the recommended route that was sent from the control center in response to the UTMS area code transmitted in step S103 is adopted. Naturally, although the route searching process can be executed and the UTMS link near the destination can be extracted in this case also, the controller 16 inhibits the transmission of the extracted UTMS link.

On the other hand, when the set destination is located within the predetermined area, a recommended route to the specified UTMS link (or UTMS node) is obtained. Thus, the route searching process is initiated (S105) using the map data and UTMS data stored in the map data memory 18 so as to search for a UTMS link (or UTMS node) that is closer to the destination. The Dijkstra method or the like is employed in this route searching process to sequentially extend branches of low cost from the destination toward the present position.

Figure 5A:
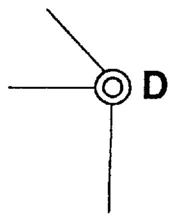
FIG. 5A illustrates the beginning of the route search process.
Figure 5B:
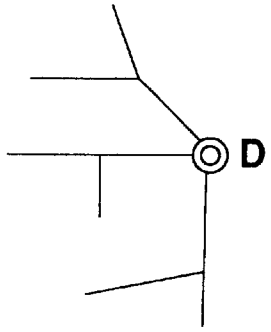
FIG. 5B illustrates the middle of the route search process.
Figure 5C:
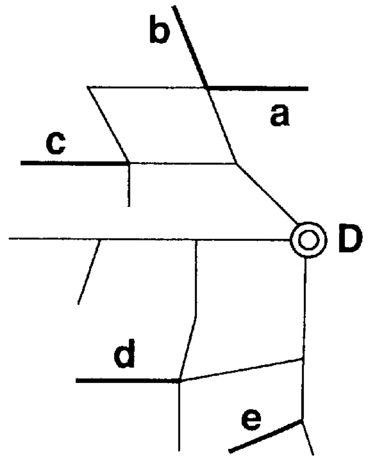
FIG. 5C illustrates the end of the route search process.

FIGS. 5A–5C conceptually show the progression of the route searching process from a destination D toward a present position. The search branches having low cost extend sequentially from destination D as shown in FIG. 5A to FIG. 5B, and further to FIG. 5C, with the search finally completing when a branch reaches the present position of the vehicle. In FIGS. 5A–5C, hairlines represent non-UTMS links, while bold lines represent UTMS links. In FIGS. 5A and 5B, only non-UTMS links are search branches, while in FIG. 5C, UTMS links begin to appear. In FIG. 5C, as the UTMS links appear in the order of "a-b-c-d-e", they are links for which route searching is possible using UTMS at the control center, and furthermore are links that reliably reach destination D. Therefore, one of the UTMS links "a" to "e" obtained by route searching from destination D is selected, such as UTMS link "a" that appeared first (S106), and transmitted as new guiding destination data (CDRGS destination) to the control center (S107). This UTMS link is closer to the destination compared to the representative point determined by the UTMS area that was transmitted in step S103, and furthermore reliably reaches the destination. Thus, the recommended route returned from the control center is a more desirable route for the vehicle. When a recommended route is sent from the control center in response to the transmitted UTMS link, the recommended route to the UTMS area (actually its representative point) that has already been obtained is replaced by the newly obtained recommended route and displayed on the display 20.

In the above manner discribed, when route searching at the vehicle completes after the UTMS link that appeared during route searching was transmitted as guiding destination data (YES at S108), the controller 16 transmits to the control center (S109) as final guiding destination data (CDRGS destination) a UTMS link (or UTMS node) nearest to the destination including a part of the shortest route obtained by the search. This UTMS link, or UTMS node, is a link, or node, from which the shortest route to the destination can be obtained. When a corresponding route is returned from the control center, the previously obtained route is replaced by the newly obtained route and displayed on the display 20.

In the above-mentioned process, the data to be transmitted may be a UTMS node instead of the UTMS link. Furthermore, after the UTMS area code corresponding to the destination is determined at step S103, when a UTMS link is obtained in the process of step S107 before the area code is transmitted to a road beacon, the controller 16 can transmit the obtained UTMS link to the road beacon without transmitting the UTMS area code. Furthermore, when route searching completes and a final UTMS link is obtained from the process of step S109 before the UTMS link obtained in the process of step S107 is transmitted to the road beacon, it is possible to transmit only the final UTMS link without transmitting the UTMS link obtained in step S107.

Figure 3:
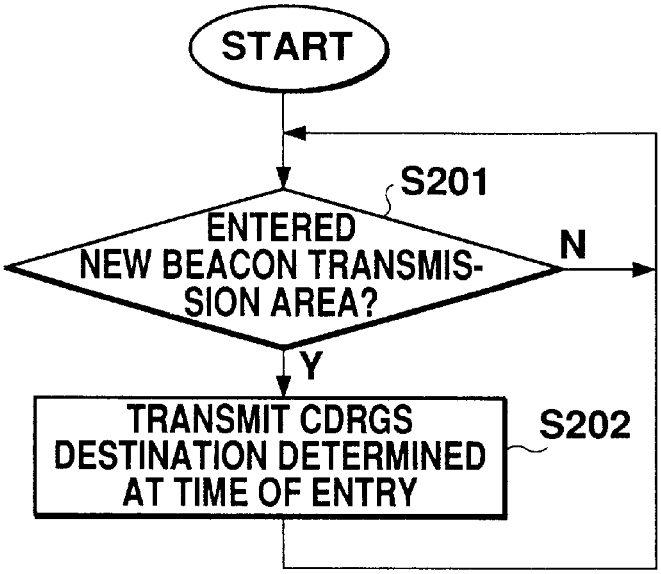
FIG. 3 is a transmission process flowchart for the first embodiment of the present invention.

FIG. 3 is a flowchart for the transmission process in this case. The UTMS area code corresponding to the destination and the UTMS link data obtained by the search are sequentially overwritten to a transmission RAM for storage, and, at a predetermined timing, it is judged whether or not (S201) the vehicle has entered a communication area of a road beacon. If the vehicle has in fact entered the communication area, at that point of entry, the transmission data stored in RAM is read and transmitted to the road beacon (S202) as guiding destination data (CDRGS destination).

Furthermore, instead of the first link that appeared during route searching from the destination toward the present position in step S107, a link that satisfies predetermined conditions may be selected as guiding destination data from a plurality of UTMS links that appear. The predetermined conditions specify a position in the vicinity of the destination and a more suitable guiding destination. More specifically, the position is to be within a predetermined angular area (such as ±30°) from the destination toward the present position, and the link is to have no traffic restrictions and have a high road category. It is also possible to select and transmit one UTMS link satisfying these conditions.

Figure 6:
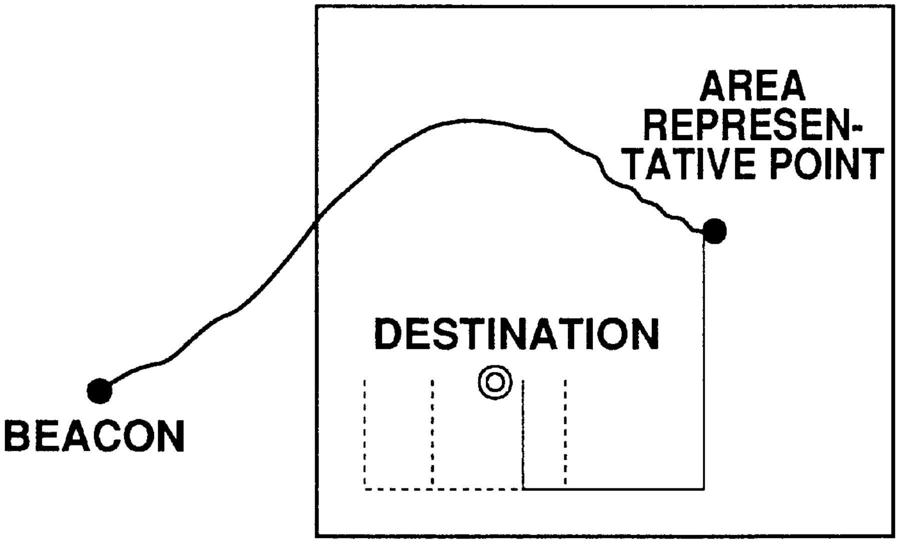
FIG. 6 illustrates a recommended route that is obtained when a UTMS area code is transmitted.
Figure 7:
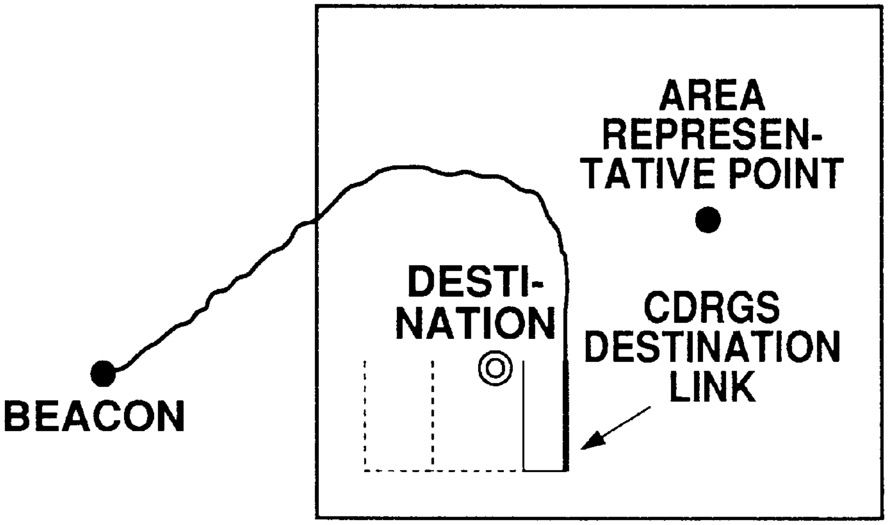
FIG. 7 illustrates a recommended route that is obtained when a UTMS link is transmitted during route searching.
Figure 8:
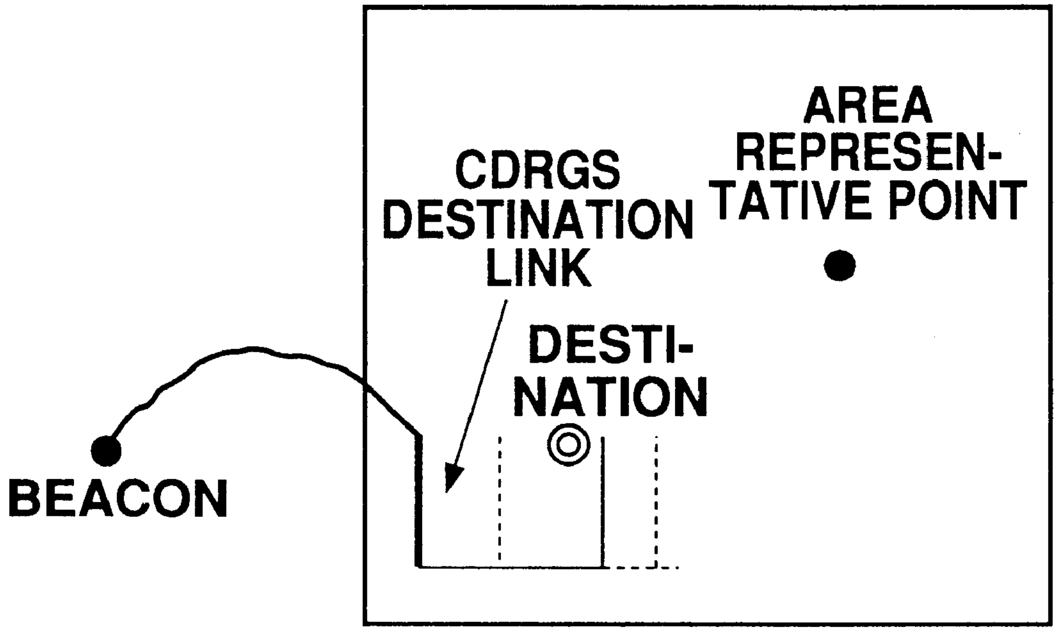
FIG. 8 illustrates a recommended route that is obtained when a UTMS link is transmitted after route searching completes.

FIGS. 6 to 8 conceptually show the route returned from the control center by the above-mentioned process. In these figures, bold lines represent a UTMS-based recommended route transmitted from the control center, while hairlines represent a route searched at the vehicle. These two routes are combined to form a route from the present position to the destination. First, the bold line in FIG. 6 is a route returned in accordance with the UTMS area code transmitted in step S103 and is a route from a beacon at the present position to a representative point of the UTMS area to which the destination belongs. This route is promptly obtained after the destination is set and reliably reaches the representative point of the UTMS area using the UTMS. However, although the destination can be reached from the representative point, there is a possibility of a detour before the destination is reached. FIG. 7 shows a route returned in accordance with the UTMS link transmitted in step S107 and is a route from a beacon at the present position to the UTMS link in the vicinity of the destination. This route takes into account the traffic conditions from the present position to the UTMS link and is a route via which the destination can be reached in the shortest amount of time and reliably. However, since the transmitted UTMS link is only the UTMS link that appeared during route searching, it is not necessarily an optimum UTMS link, and as seen from the present position, the route may possibly result in a detour. (Naturally, if a UTMS link that satisfies the above-mentioned predetermined conditions is selected, the possibility is high that the UTMS link is optimum.) FIG. 8 is a route returned in accordance with the UTMS link transmitted in step S109 and is an optimum route to the destination. Namely, the destination can be reached in the shortest amount of time by traveling from the present position to the UTMS link transmitted from the control center along the route returned from the control center, and traveling from the UTMS link to the destination along the shortest route searched at the vehicle.

The present embodiment enables a route to be promptly obtained using the UTMS after the destination has been set, and thereafter enables an optimum route to the destination to be obtained so as to improve the utilization efficiency of the system by:

(1) Transmitting, after a destination is set, a UTMS area code to which the destination belongs as temporary guiding destination data;

(2) Transmitting as guiding destination data the first UTMS link (or UTMS node) that appears during route searching from the destination toward the present position, or a UTMS link that satisfies predetermined conditions among a plurality of UTMS links; and (3) Then, when route searching has completed, transmitting as guiding destination data a UTMS link (or UTMS node) closest to the destination including a part of the searched route.

The controller 16 does not necessarily have to execute all processes of the aforementioned (1) to (3). For example, only the processes for (1) and (2), or only the processes for (1) and (3), or only the process for (1) can be executed.

Even in the case where all processes (1) to (3) are executed, if the UTMS link obtained in process (3) is separated by at least a predetermined value from the destination, or in other words, separated by a predetermined distance or at least by a predetermined number of links from the destination, it is preferable for the controller 16 to inhibit the transmission of this UTMS link, resulting in only processes (1) and (2) being executed. If the finally extracted UTMS link is separated from the destination, this means that in all routes from the present position to the destination the interval in which the UTMS service can be received is that much shorter. Thus, even though there is a possibility of a detour in this case, the transmission of the UTMS link closest to the destination obtained in process (2) enables the UTMS service to be fully utilized. More specifically, in the flowchart of FIG. 2, a step is provided to judge whether or not the UTMS link that is obtained when the search completes after the processing of step S108 is separated from the destination by at least a predetermined value (predetermined number of links), and the processing of step S109 may be inhibited if the separation is at least a predetermined distance.

Furthermore, whereas the present embodiment showed the transmission and reception of information between the vehicle and control center via beacons, the present invention is not limited to their use and may employ any means of communication, such as car telephones.

According to the present invention as described above, a route taking into account traffic conditions can be promptly obtained from the control center even though route searching is not completed at the vehicle, thereby raising the utilization efficiency of the UTMS and allowing smooth travel from the present position to the destination.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A route guidance apparatus comprising:

destination setting means;

memory means for storing map data, and Universal Traffic Management System (UTMS) data; and transmitting means for transmitting to a control center as a temporary guiding destination, when a destination has been set with said destination setting means, UTMS area data to which said destination belongs, the UTMS area data identifying a mesh in the UTMS coverage area that corresponds to said destination.

2. The apparatus according to claim 1, further comprising route searching means for searching for a shortest route to said destination using said map data, wherein said transmitting means, after transmitting said UTMS area data, when said shortest route is obtained by said route searching means, transmits as a guiding destination a UTMS node or UTMS link in the vicinity of said destination including a part of said shortest route.

3. The apparatus according to claim 2, further comprising means for inhibiting transmission of said guiding destination by said transmitting means when said destination is located outside the UTMS area.

4. The apparatus according to claim 2, further comprising route searching means for searching for a shortest route to the destination using the map data, wherein said transmitting means, after transmitting said UTMS area data, transmits as the guiding destination the first UTMS link or UTMS node obtained through route searching by said route searching means from said destination toward a present position.

5. The apparatus according to claim 4, further comprising means for inhibiting transmission of said guiding destination by said transmitting means when said destination is located outside the UTMS area.

6. The apparatus according to claim 1, further comprising route searching means for searching for a shortest route to said destination using said map data, wherein the transmitting means, after transmitting the UTMS area data, transmits as the guiding destination the first UTMS link or UTMS node obtained through route searching by said route searching means from said destination toward the present position, and when the shortest route is obtained thereafter by said route searching means, transmits as a final guiding destination a UTMS node or UTMS link in the vicinity of said destination including a part of said shortest route.

7. The apparatus according to claim 6, further comprising means for inhibiting transmission of said guiding destination and said final guiding destination by said transmitting means when said destination is located outside the UTMS area.

8. The apparatus according to claim 6, further comprising means for inhibiting transmission of said final guiding destination by said transmitting means when said final guiding destination is separated from said destination by at least a predetermined value.

9. The apparatus according to claim 1, further comprising route searching means for searching for a shortest route to said destination using said map data, wherein said transmitting means, after transmitting said UTMS area data, transmits as the guiding destination a UTMS link or UTMS node satisfying predetermined conditions among a plurality of UTMS links or UTMS nodes obtained by said route searching means during route searching from said destination toward the present position.

10. The apparatus according to claim 9, further comprising means for inhibiting transmission of said guiding destination by said transmitting means when said destination is located outside the UTMS area.

11. The apparatus according to claim 9, wherein said predetermined conditions specify the UTMS link or UTMS node is to exist within a predetermined angle from said destination toward said present position and is to have no traffic restrictions.

12. The apparatus according to claim 1, further comprising route searching means for searching for a shortest route to said destination using said map data, wherein said transmitting means, after transmitting the UTMS area data, transmits as the guiding destination a UTMS link or UTMS node satisfying predetermined conditions among a plurality of UTMS links or UTMS nodes obtained by said route searching means during route searching from said destination toward the present position, and when the shortest route is obtained thereafter by said route searching means, transmits as a final guiding destination a UTMS node or UTMS link in the vicinity of said destination including a part of said shortest route.

13. The apparatus according to claim 12, further comprising means for inhibiting transmission of said guiding destination and said final guiding destination by said transmitting means when said destination is located outside the UTMS area.

14. The apparatus according to claim 12, further comprising means for inhibiting transmission of said final guiding destination by said transmitting means when said final guiding destination is separated from said destination by at least a predetermined value.

15. The apparatus according to claim 12, wherein said predetermined conditions specify the UTMS link or UTMS node is to exist within a predetermined angle from said destination toward said present position and is to have no traffic restrictions.

* * * * *